US009361578B2

(12) United States Patent
Schmidt et al.

(10) Patent No.: US 9,361,578 B2
(45) Date of Patent: Jun. 7, 2016

(54) MEMORY EFFICIENT STATE-SET REPRESENTATION FOR PLANNING

(75) Inventors: Tim C. Schmidt, Campbell, CA (US); Rong Zhou, San Jose, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 762 days.

(21) Appl. No.: 13/181,585

(22) Filed: Jul. 13, 2011

(65) Prior Publication Data
US 2013/0018922 A1 Jan. 17, 2013

(51) Int. Cl.
G06F 17/30 (2006.01)
G06N 5/00 (2006.01)
H04L 29/12 (2006.01)

(52) U.S. Cl.
CPC .......... *G06N 5/003* (2013.01); *G06F 17/30985* (2013.01); *G06F 17/30949* (2013.01); *G06F 17/30958* (2013.01); *H04L 29/12132* (2013.01); *H04L 29/12462* (2013.01)

(58) Field of Classification Search
CPC ............... G06F 17/30985; G06F 17/30949; G06F 17/30958; H04L 29/12132; H04L 29/12462
USPC ......... 707/797, 758, 706, 713, 737, 741, 745, 707/769, 790, 795, 798, 693
See application file for complete search history.

(56) References Cited

U.S. PATENT DOCUMENTS

| 7,433,871 | B2 * | 10/2008 | Deforche et al. ........ 707/999.01 |
| 7,584,444 | B2 | 9/2009 | Zhou |
| 7,805,454 | B2 | 9/2010 | Zhou |
| 7,844,924 | B2 * | 11/2010 | Sasao et al. ................... 716/104 |
| 7,948,980 | B2 * | 5/2011 | Lu et al. ........................ 370/389 |
| 2010/0017397 | A1 * | 1/2010 | Koyanagi et al. .................. 707/5 |
| 2010/0094885 | A1 * | 4/2010 | Andrews ....................... 707/756 |
| 2011/0137930 | A1 * | 6/2011 | Hao et al. ....................... 707/769 |
| 2011/0191382 | A1 * | 8/2011 | Ghoting et al. ............... 707/797 |

FOREIGN PATENT DOCUMENTS

WO 03069509 A2 8/2003

OTHER PUBLICATIONS

D. Yang, A. Johar, A. Grama, W. Szpankowski; "Summary Structures for Frequency Queries on Large Transaction Sets", Data Compression Conference, 200, Proceedings DCC 2000; published 2000; pp. 420-429.*
Bryant, R.E., "Graph-Based Algorithms for Boolean Function Manipulation", IEEE Transactions on Computers, 35, 1986, pp. 677-691.
Culberson, J. et al., "Pattern Databases", Computational Intelligence, 14(3), 1998, pp. 318-334.
Edelkamp, S. et al., "The Model Checking Integrated Planning System (MIPS)", AI Magazine, 22(3), 2001, pp. 67-71.
Edelkamp, S. et al., "Limits and Possibilities of BDDS in State Space Search", KI 2008: Advances in Artificial Intelligence, 2008, pp. 46-53.
Helmert, M., "The Fast Downward Planning System", Journal of Artificial Intelligence Research, 26(1), 2006, pp. 191-246.

(Continued)

*Primary Examiner* — Dangelino Gortayo
(74) *Attorney, Agent, or Firm* — Fay Sharpe LLP

(57) ABSTRACT

A method for encoding state sets which encodes a binary prefix tree representation as a level ordered edge sequence (LOES) where the inner tree nodes are ordered from left to right, and top to bottom order and coded as bit pairs which represent the presence of leaf nodes.

17 Claims, 8 Drawing Sheets

(56) References Cited

OTHER PUBLICATIONS

Jacobson, G., "Succinct Static Data Structures", Ph.D. Dissertation, Carnegie Mellon University, Pittsburgh, PA, 1988.

Jensen, R.M. et al., "SetA*: An Efficient BDD-Based Heruistic Search Algorithm", in Proceedings of AAAI-2002, pp. 668-673.

Korf, R., "Depth-first Iterative-Deepening: An Optimal Admissible Tree Search", Artificial Intelligence, 27(1), 1985, pp. 97-109.

Lind-Nielsen, J. et al., "Verification of Large State-Event Systems Using Compositionality and Dependency Analysis", Formal Methods in System Design, 18(1), 2001, pp. 5-23.

Munro, J. et al., "Succinct Representation of Balanced Parentheses and Static Trees", SIAM Journal on Computing, 31, 2001, p. 762.

Zhou R. et al., "Breadth-First Heuristic Search", in Proceedings of the 14th International Conference on Automated Planning and Scheduling, 2004, pp. 92-100.

Guravannavar, Ravindra, et al., "Reducing Order Enforcement Cost in Complex Query Plans", Data Engineering, 2007, ICDE 2007, IEEE 23rd Int'l Cont. On, IEEE, PI, Apr. 1, 2007, pp. 856,865.

Tzeng, Henry Hong-Yi, "Longest Prefix Search Using Compressed Trees," IEEE Globecom 1998, IEEE, Nov. 8, 1998.

Schmidt, Tim, et al., "Succinct Set-Encoding for State-Space Search", AAAI-11/IAAI-11, Proceedings of the 25th AAAI Conf. on Artificial Intelligence, San Francisco, CA, Aug. 7, 2011, p. 87-92.

European Search Report, Appl. No. EP12175228, Dated Jul. 18, 2013, Mailed Jul. 25, 2013, The Hague.

* cited by examiner

MEMORY EFFICIENT STATE-SET REPRESENTATION FOR PLANNING

BACKGROUND

The present application is directed to searching and more particularly to computer based state-space searching. A particular challenge in computer programming for a state-space search is to make efficient use of available computer memory. Best-first search algorithms such as A* are often constrained by the amount of memory used to represent state-sets in the search frontier (the Open list), previously expanded states (the Closed list), and memory based heuristics including pattern databases (PDBs), which are a lookup tables that store the distance to the abstract goal of every abstract state (or "pattern").

Although linear-space search algorithms such as IDA* (Depth-First Iterative Deepening) solve the memory problem for A*, they need extra node expansions to find an optimal solution, because linear-space search typically does not check for duplicates when successors are generated and this can lead to redundant work. Essentially, these algorithms trade time for space and their efficiency can vary dramatically, depending on the number of duplicates encountered in the search space. For domains with few duplicates such as the sliding puzzles, IDA* easily outperforms A*. But for other domains such as multiple sequence alignment, linear-space search simply takes too long. For STRIPS (Stanford Research Institute Problem Solver) planning, IDA* can expand many more nodes than A*, even if it uses a transposition table. As a result, state-of-the-art heuristic search planners such as Fast Downward (FD) use A* instead of IDA* as their underlying search algorithm.

A classic approach to improving the storage efficiency of A* is to use Binary Decision Diagrams (BDDs) to represent a set (or sets) of states compactly. By merging isomorphic sub-graphs, BDDs can be much more succinct than an equivalent explicit-state representation. For example, BDD-based planners such as MIPS (Model Checking Integrated Planning System) perform extremely well on domains like Gripper where BDDs are exponentially more compact than explicit state storage. However, such showcase domains for BDDs are only a small fraction of the benchmark problems found in planning, and most heuristic search planners still use explicit state representation, even though they can all benefit from having a succinct storage for state sets.

BRIEF DESCRIPTION

A method and system for encoding state sets which encodes a binary prefix tree representation as a level ordered edge sequence (LOES) where the inner tree nodes are ordered from left to right, and top to bottom order and coded as bit pairs which represent the presence of leaf nodes.

DETAILED DESCRIPTION

In the following discussion it is assumed that the encoding size of a search problem can be determined up front (e.g., before the start of the search). Further, without loss of generality, it is also assumed m is the number of bits required to encode any state for a given problem. Using these understandings any set of such states can be represented as an edge-labeled binary tree of depth m with labels false and true. Every path from the root to a leaf in such a tree corresponds to a unique state within the set (and vice versa) and can be reconstructed by the sequence of edge-labels from the root to the leaf. In the context of this work, these trees are referred to as prefix trees. All elements represented by a sub-tree rooted by some inner node share a common prefix in their representation denoted by the path from the root to that node.

In consideration of the above, and as will be expanded on in more detail in the following discussion, disclosed herein is a method and system for encoding such prefix trees which minimizes memory requirements. The state set is of a known size and each state is a binary sequence. A state set is represented as a prefix tree. The prefix tree is reduced in size by reordering the bits of the state space set. The reduced prefix tree is then encoded according to a method disclosed and called herein Level Ordered Edge Sequence (LOES). A LOES encoding is the level order concatenation of 2-bit edge pair records for each inner node of the reduced prefix tree, where the bits encode the presence or absence of the false and true edges at each node.

Figure 1:
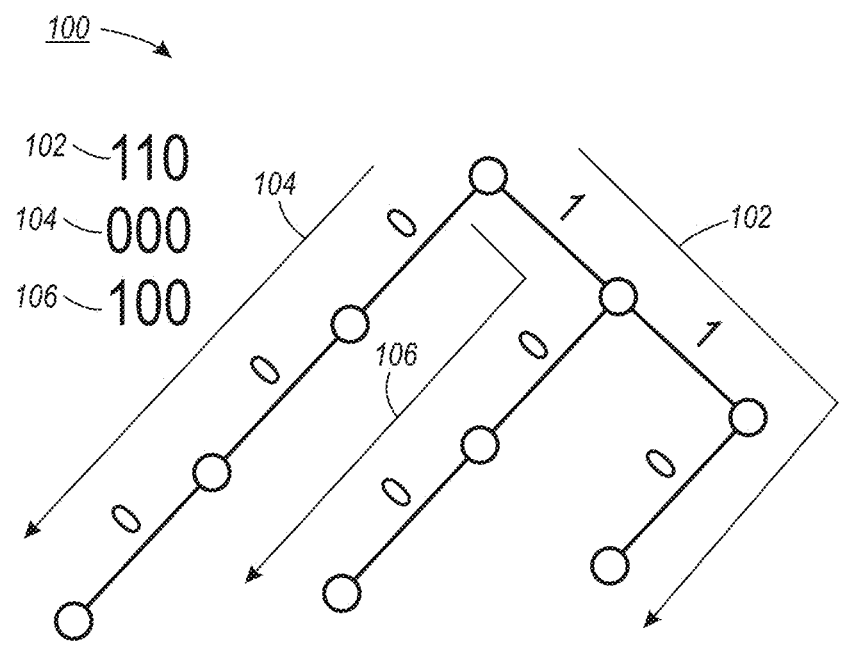
FIG. 1 depicts three bit sequences and a corresponding induced prefix tree.

Turning to FIG. 1 illustrated is a prefix tree 100 induced from bit sequences "110", "000", "100". More particularly sequence "110" traverses prefix tree 100 via path 102, sequence "000" traverses prefix tree 100 via path 104, and sequence "100" traverses prefix tree 100 via path 106. This prefix tree is used in the following discussion to assist in disclosing the concepts of the present application. It is to be appreciated however, that this prefix tree is used only as an example and the present concepts may be used in other search arrangements.

Figure 2:
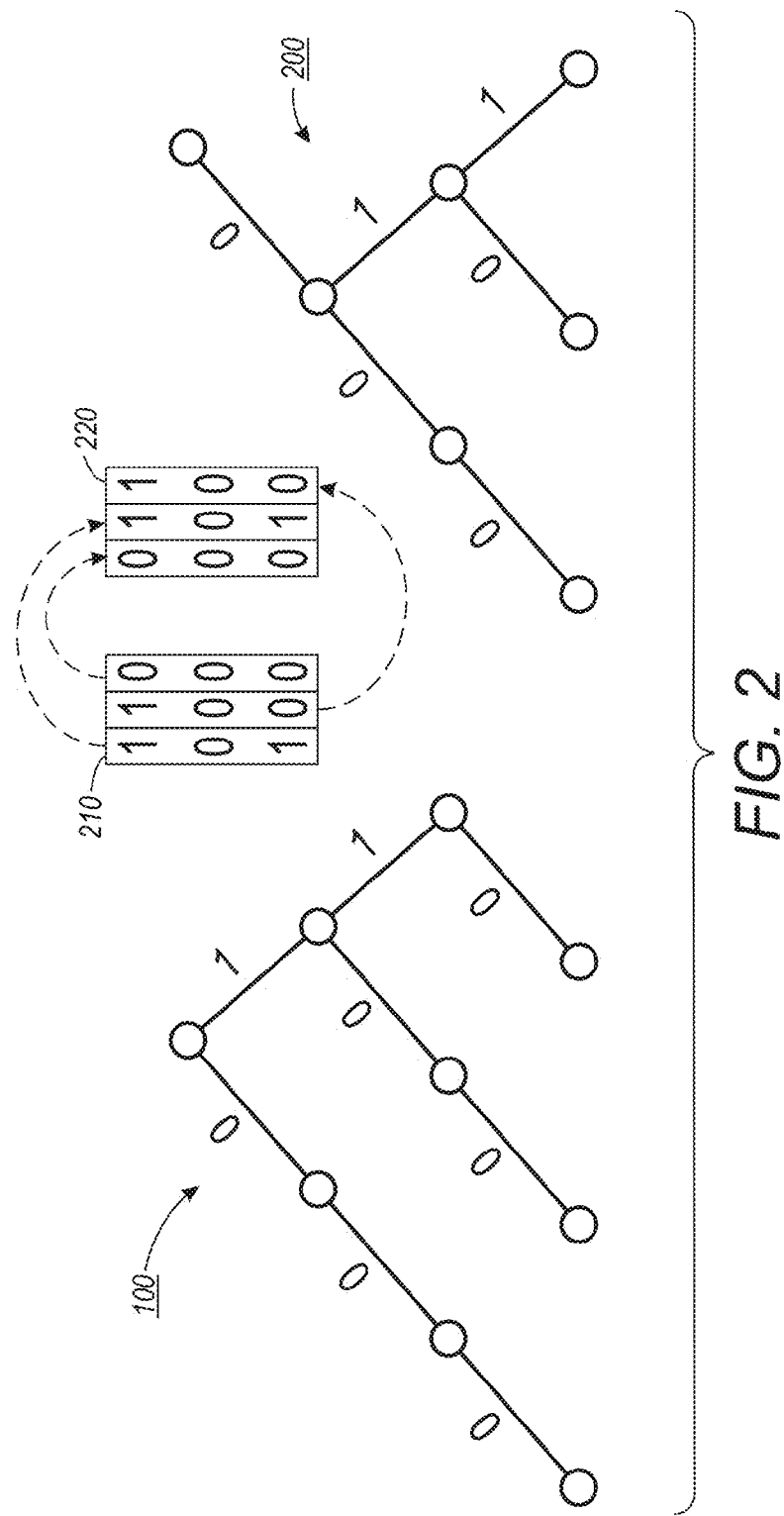
FIG. 2 is a diagram showing an example of the reordering of bits in a state space set and the resulting reduced prefix tree.

FIG. 2, illustrates prefix tree 100 preferably altered to a minimized prefix tree 200, where prefix tree 100 has been reduced in size through reordering of the state space bit set representation.

Permuting the State Representation

It is understood that storage efficiency depends on the average length of common prefixes shared between members of a represented set which in turn depends on the ordering of bits used in the state-encoding. FIG. 2 shows a permutation of the bit order of a set of states, which reduces the size of prefix tree 100. The original states "110", "000", and "100" 210 are permuted or reordered to states "011", "000", and "010" 220, respectively. There is a one to one correspondence between elements of the original state set and the permuted state set.

In one embodiment to efficiently approximate the minimally sized prefix tree representation 200, a greedy type search is undertaken through permutations on the original bit-order to find one that maximizes the average length of the common prefixes. In this regard, as a first step a sample set of states is generated from a singleton state comprised of an initial state. At each iteration, a state is randomly selected from the set, its successors are generated and added back to the set. The process ends once the set has grown to a specified size or after a fixed number of iterations have been executed, whichever occurs first. The random selection is intended to generate a good sample of valid states at different search depths.

Then, a suitable bit order is deduced by greedily constructing a prefix tree over these sample states in a top-down fashion, such as may be accomplished according to Algorithm 1 shown below, where S is an element of "subtrees", s is a bit sequence of S, and H is information theory entropy.

---

Algorithm 1: minimal entropy bit-order

Input: sampleset a set of sampled states
Output: bitorder a permutation of the state encoding
subtrees ← {sampleset};
bitorder ←();
while unassigned bit-positions do
    foreach unassigned bit-position p do
        subtrees$^p$ ← {0};
        foreach S ∈ subtrees do
            $S_{true}^p$ ← {s ∈ S : s[p] = true};
            $S_{false}^p$ ← S/$S_{true}^p$;
            subtrees$^p$ ← subtrees$^p$ ∪ {$S_{true}^p$} ∪ {$S_{false}^p$};
    p* ← argmin{H(subtrees$^p$)};
        p
    bitorder ← bitorder ∘ p* ;
    subtrees ← subtrees$^{p*}$ ;

---

This process moves bits whose values are near constant in the sample set to the most significant bit positions in the permuted or reordered string. In the present example, the process yielded prefix tree 200, which is reduced in size because the high order bits are common and thus represent a shared path from the root rather than separate paths. The order of the assigned bits of the state space set is the reordered state space set ("011", "000", "010") 220. Using a one-to-one correspondence the original states (e.g., "110", "000", "100") 210 can be constructed from the reordered state 220, and the reordered state can be constructed from the original states.

Each iteration begins with sets for each leaf node of the current tree, holding the subset with the prefix corresponding to the path from the root to the leaf node. The process starts with a single leaf-set comprising all sample states, an empty bit-order and all bit-positions designated as candidates. During iteration each remaining unassigned candidate bit is reviewed and a temporary new tree layer is created by partitioning each set according to the value of this bit in its states. To maximize average prefix lengths the candidate with the least entropy in its leaf-sets is selected as next in the bit-order. The process ends after m iterations, when all candidates have been assigned.

Entropy is calculated across all legs. That is the whole sample-set is partitioned according to the current sequence of bit-positions (i.e. there are 2^ (number of selected positions) logical partitions, some of which may be empty). Each subset represents the set of samples pertaining to a leg of the tree. This can be interpreted as a distribution, for which entropy is computed. At each iteration, this is logically done for all length+1 sequences resulting from appending one of the candidate (i.e. not yet assigned) bit positions to the already fixed sequence from the last iteration. Then the sequence with the least entropy is chosen (intuitively, in information theory, entropy is a measure of the expected information gain for sampling a random variable, i.e. its unpredictability; that is, the outcome of such that sampling is highly uncertain for a variable with maximum entropy and absolutely certain for one with minimal entropy). For LOES, the interest is in maximizing average prefix lengths. Therefore, for any sequence inserted, it is desirable to fall into a small subset of individually large partitions with high probability (hence a very predictable and low-entropy random variable).

LOES Encoding

While the tree representation obtained by the above process eliminates prefix redundancy among set-members, straightforward implementations can easily exceed a simple concatenation of the members' bit-strings in size. The culprits are pointers, each of which can take up to 8 byte of storage on current machines. An alternative are pointer-less structures such as an Ahnentafel representation of binary heaps. A historical Ahnentafel represented the generational order of individuals solely through their positions in the document. At the first position is the subject. The ordering rule is that for any individual at position i, the male ancestor can be found at position 2i and the female ancestor at position 2i+1 with the offspring to be found at position (i/2). More generally a binary tree is stored in an array through a bijection which maps its elements (e.g., individuals) to positions in the array in level-order (e.g., the order of their generation). This technique is well suited for full binary trees (such as binary heaps), but relatively costly for general binary trees. However it can be adapted to the concepts of the present method and system as the following illustrates.

First, an information-theoretical view on the encoding of binary trees is provided. The number of different binary trees with regard to their number of nodes is given by Catalan numbers.

$$C_0 = 1, C_n = \Sigma_{i=0}^{n-1} C_i C_{n-1-i} \text{ for } n \geq 0$$

Stirling's approximation gives log 2 $C_n$ as $2_n$+O(n), which provides an idea of the information theoretic minimum number of bits required to represent a general binary tree of n nodes. A number of different known encodings exist (such as for example described by Jacobson in: Succinct static data structures Ph.D. Dissertation, Carnegie Mellon University Pittsburgh, Pa. 1988 and Munro and Raman in: Succinct representation of balanced parentheses and static trees, SIAM Journal on Computing 2001, 31:762) that can store such trees with 2-bits per tree-node and which support basic tree navigation with little additional overhead space. Prefix-trees according to the present application are constrained in that all leaves are at depth m−1.

The present application describes an encoding that exploits the above property, and which results in shorter codes as well as simpler and faster algorithms. This encoding is called herein, Level-Ordered Edge Sequence encoding or LOES encoding. It is defined as the level-order concatenation of 2-bit-edge-pair records for each inner node of the tree (the bits corresponding to the presence of false and true edges at that node).

Figure 3:
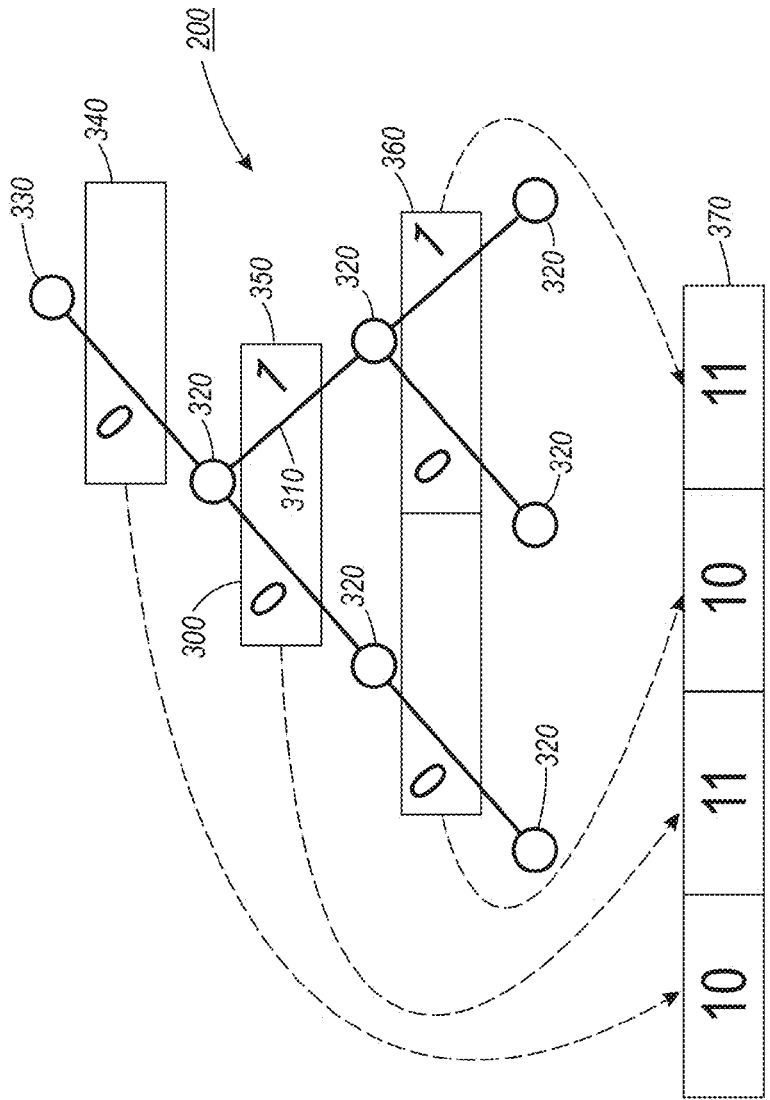
FIG. 3 is a diagram showing the encoding of an example prefix tree as a LOES encoding.

FIG. 3 illustrates one embodiment by which LOES encoding allows for the encoding of the presented example set of the reordered states "000", "010" and "011" 220 in a single byte, i.e., a little more than half the length of the more general encodings mentioned above.

In FIG. 3, false leaves 300 on the left side of a node represent a state bit encoded with a particular identifier, such as 0. True leaves 310 on the right side of a node represent a state bit encoded with another identifier such as a 1. The reordered state bits 220 are represented in an order where each bit is of a node 320, and the child of the node is the next bit in the state sequence. Beginning with the root node 330 the leaves of each node are encoded as a pair with a 1 indicating a leaf node (e.g., 300 or 310) is present and a 0 representing that the leaf node is absent.

To address any potential confusion, it is explained here that the use of "0" to represent a false (edge) leaf node as mentioned above, is different from the use of "0" to represent the absence of a leaf node all together, i.e., whether it is a false or true leaf node. Similarly, the use of a "1" to represent a true (edge) leaf node is different from the use of "1" to represent the existence of a leaf node, i.e., again whether it is a false or a true node.

The encoding proceeds in left to right, and top to bottom order for each inner node. Assuming a state encoded as m bits, there are m−1 levels 340, 350, 360 encoded, where again prefix tree 200 is constrained in that all leaves are at depth m−1. Each level 340, 350, 360 of prefix tree 200 is traversed and encoded in 2-bit pairs. For example, a bit pair of "10" represents the presence of only a false leaf node 300, while a bit pair of "01" represents the presence of only a true leaf node 310. A bit pair of "11" represents that both a false 300 and a true 310 leaf node exist. The 2-bit pairs are concatenated within each level in order from left to right, and the string of bits of each level are concatenated in order from top to bottom to form an entire level-order edge sequence 370, where the bits correspond to the presence of false edges 300 and true edges 310 at each node.

Space Requirements of LOES-Sets

For a set of n unique states, the prefix tree is maximal, if the average common prefix length of the states is minimal. Intuitively this results in a structure that resembles a perfect binary tree up to depth $k=(\log_2 n)$ and degenerate trees from each of the nodes at depth k. Hence the set-tree will at worst encompass 2n+n(m−k) nodes. For large sets of long states (i.e. $\log_2 n \ll m \ll n$) this is less than $(2+m)n \approx nm$ nodes. As each node (with the exception of the tree root) has exactly one (incoming) edge and each record in LOES holds at least one edge, the code will at worst be little more than twice the length of the concatenation of packed states in the set.

The best case results from the opposite situation, when the structure represents a degenerate tree up to depth $j=m-[\log_2 n]$, followed by a perfect binary tree on the lower levels. Such a tree comprises of 2n+(m−j) nodes, of with each record in the binary tree representing two edges. For large sets (i.e. $m \ll n$), 2n bits is hence a tight lower bound on the minimal length of the LOES code.

Tree Operations

For use in state-space search or planning three different operations need to be enabled in a time and space efficient manner: (1) set-member queries, (2) a bijective mapping of a set's n elements to integers 0 . . . n−1 to allow efficient association of ancillary data to states and (3) iterating over set elements. All of these operations require efficient navigation through the LOES. For any edge in the sequence at some offset o, the entries for the false and true edges of the node it points to can be found at offsets 2rank(o) and 2rank(o)+1 where rank(o) is a function that gives the number of set bits in the sequence up to (and including) offset "o". This is because each set bit (present edge) in the LOES code results in an edge-pair record for the target node on the next level (with the exception of the leaf level). As these records are stored in level order, all preceding (in the LOES) edges result in preceding child records. Hence the child record for some edge at offset o will be the rank(o)+1-th record in the sequence (as the root node has no incoming edge). Transforming this to offsets with 2-bit records, 2rank(o) and 2rank(o)+1 then give the respective offsets of the presence bits of the target node's false and true edges.

Rank

The present implementation makes use of a two-level index, which logically divides the LOES into blocks of $2^{16}$ bits and sub-blocks of 512 ($2^9$) bits. These subdivisions can be varied according to domain-needs enabling fine-grained time-space tradeoffs. For each block, the index holds an 8-byte unsigned integer, denoting the number of set bits from the beginning of the sequence up to the beginning of the block. On the sub-block level, a 2-byte unsigned value stores the number of set bits from the beginning of the corresponding block up to the beginning of the sub-block. The index overhead within a block is therefore:

$$\underbrace{\frac{64}{2^{16}}}_{block\ index} + \underbrace{\frac{16}{2^9}}_{sub-block\ index} \approx 0.0323 \qquad (1)$$

With these indices, the rank function comprises straightforward look-ups of the block and sub-block indices and set-bit counting within the sub-block.

Path.Offset

The path-offset function may, in one embodiment, be accomplished by Algorithm 2 as shown below.

---
Algorithm 2: path-offset
---
Input: state a bitsequence of length m
Output: offset an offset into LOES
Data: LOES an encoded state-set
offset ← 0;
for depth ← 0 to m − 1 do
   if state[depth] then
      offset ← offset + 1
   if LOES[offset] then
      if depth = m − 1 then
         return offset;
      else
         offset ← 2rank$_{LOES}$(offset);
   else
      return ⊥;

---

Particularly the path-offset function navigates through the LOES according to the path interpretation of a state. If the state represents a valid path from the tree root to some leaf, the function returns the offset of the bit corresponding to the last edge of the path. Else it evaluates to ⊥. An example of such navigation will be shown in connection with FIG. 4.

Figure 4:
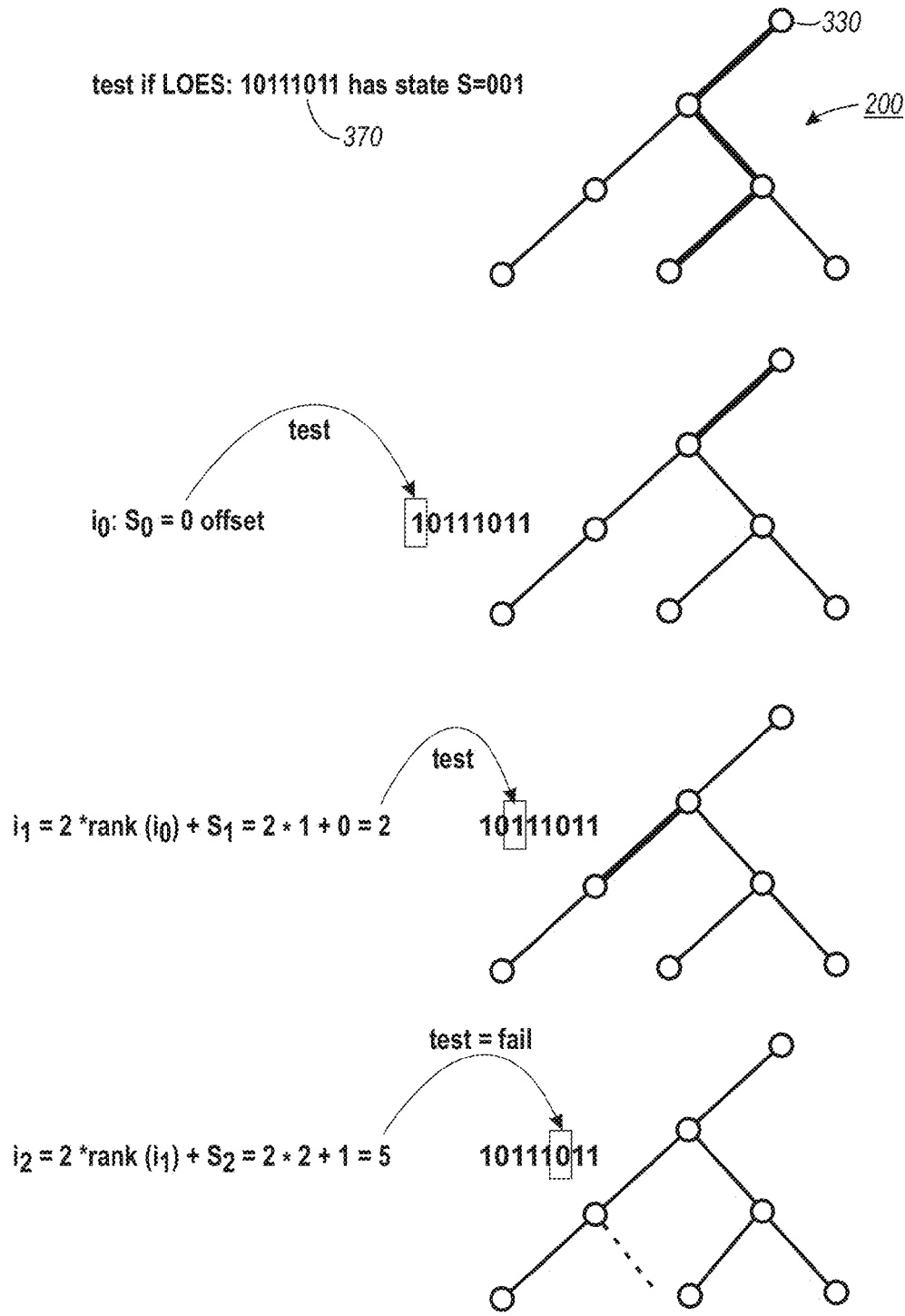
FIG. 4 is a diagram showing an example of whether a state space is a member of the LOES encoding.

Turning now to FIG. 4, for the reduced prefix tree a path offset can be computed for every valid path and/or valid state. Particularly FIG. 4 illustrates navigating of the LOES encoding "10 11 10 11" (370 of FIG. 3) to determine if a state s=001 exists. In this simple example it is known the s=001 is invalid as the valid states for the example LOES encoding are known to be states—000, 010, and 011. However, for instructional purposes the process to prove that s=001 is invalid is useful. The process uses a rank function, which is defined as the number of bits set to 1 up to and including the offset (which starts at 0). For any edge at some offset, the entries for the false and true edges of the node it points to can be found at offsets 2*rank(offset) for the false edge and 2*rank(offset)+1 for the true edge.

Because the rank uses a count of the set bits up to and including the offset, including the number of set bits in the indexes improves the time to calculate the rank for a specific offset. Summing the values stored in a preceding block and sub-block indexes provides the value up to the individual bit sequences within the sub-block being examined, which is then inspected bit by bit.

The path offset uses the rank function to navigate the LOES encoding 370. Beginning at the root 330 with an offset of 0 (i.e., at $i_0$ of FIG. 4), either 2*rank(offset) for a state bit of 0 or 2*rank(offset) for a state bit of 1 is calculated for a new offset and the LOES bit at that location is tested. If the value is 1 (which in this case it is at $i_1$ of FIG. 4), it represents that the leaf is present and the path thus far is valid. If the value is 0, it represents that the leaf is absent and the path is invalid. If the path is valid, then the next bit of the state is inspected and a new offset is calculated. The process continues until each bit of the state has been inspected, and the lowest level in the LOES is reached. When the final bit is located through the offset and inspection determines that a leaf is present by a 1 bit, the state is a valid state. If at any point the path is invalid, then as in the example (i.e., at $i_2$ of FIG. 4), the state is not a member represented in the LOES encoding.

Member Test

Based on the offset function, member tests are straightforward. A set contains a state, if and only if its path interpretation corresponds to a valid path through the prefix tree.

A member test for a state in the LOES encoding is determined by the existence of valid paths within the LOES encoding for the given state, such as valid paths such as 102, 104, and 106 of FIG. 1.

Member Index

A member index function may be implemented in one embodiment by the steps shown in Algorithm 3 below.

---
Algorithm 3: member index
---
Input: state a bitsequence of length m
Data: LOES an encoded state-set
Data: levelOffsets array of offsets
o ← path-offset (state);
if o = ⊥ then
⌊ return ⊥;
a ← $rank_{LOES}$(o);
b ← $rank_{LOES}$(levelOffsets[m − 1] − 1);
return a − b − 1;
---

The member index function maps states to values {⊥, 0, . . . , n−1}. It is bijective for all member states of the set and hence allows associating ancillary data for each member without requiring pointers. The idea is that each set-member's path corresponds to a unique edge at the leaf-level of the tree. The path-offset function gives the address of that bit. By computing the rank of the address, each state is assigned a unique integer in a consecutive range. These values are normalized to the interval (0: n) by subtracting the rank of the last offset of the last-but-one layer+1. These concepts are illustrated by FIG. 5.

Figure 5:
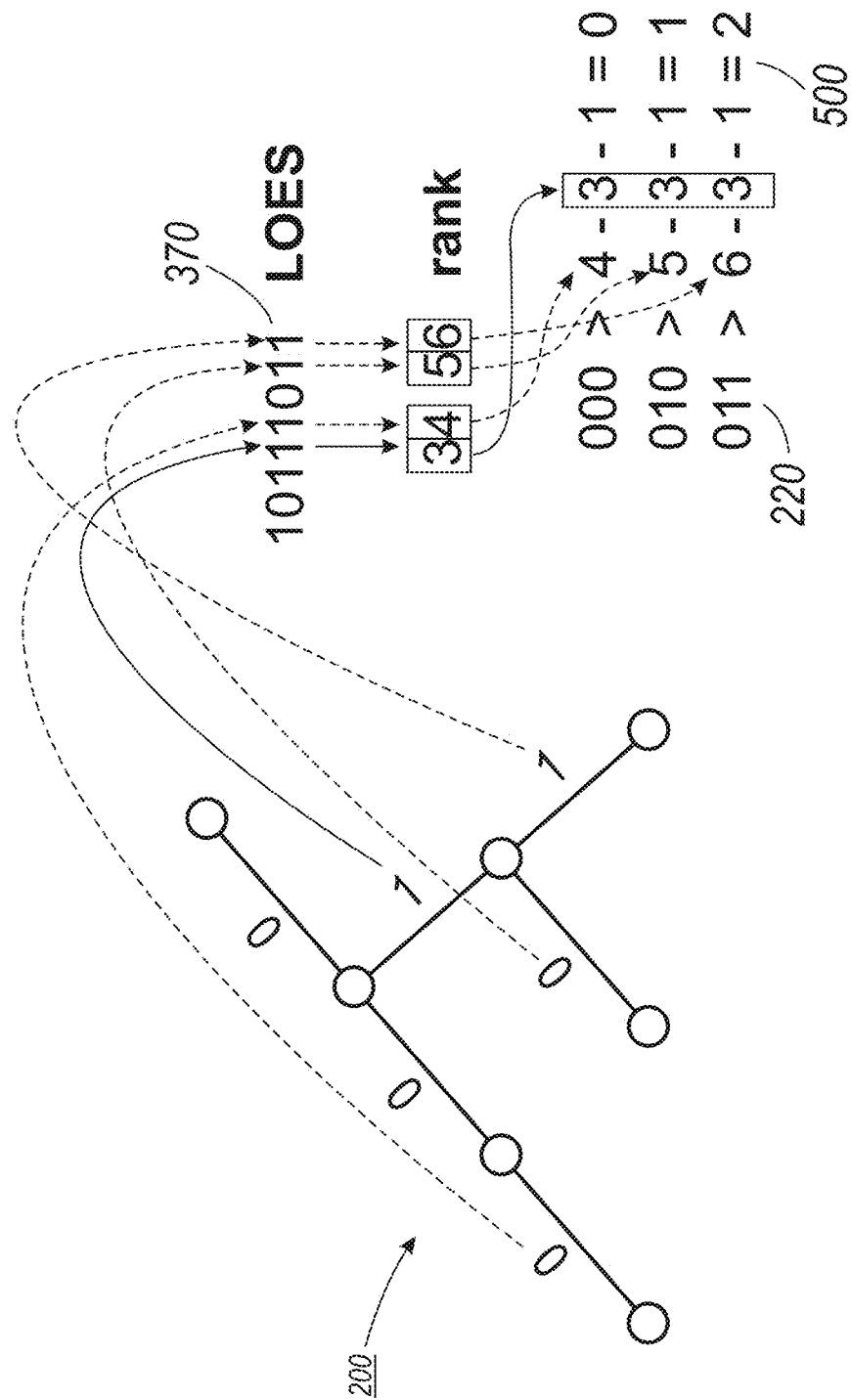
FIG. 5 is a diagram showing an example of how an index to ancillary data is computed.

Turning to FIG. 5 shown are index mappings 500 to ancillary data for all states in the example set 220. These index mappings 500 are separate from the indexes used to index blocks and sub-blocks of the LOES encoding "10111011" 370. The index mappings 500 from state spaces to ancillary data structures are bijective and therefore, as mentioned, do not require the use of pointers, or the additional memory required by pointers.

The index mappings 500 are normalized to the interval (0; n) where n is the number of state spaces. In the example, to find the indexes for each of the state spaces (000, 010, and 011) 220 the previously described rank function is used. The offset for each state space is found using the previously discussed path offset or final offset. Finding the rank of that offset yields a value, which is shown in the example as 4, 5, and 6 for each of the state spaces respectively. One (1) is added to the rank of the last edge in the prior level, which is then subtracted from the value from the rank of the state path offset to yield a normalized index. This is also written as rank(offset)−(rank(last edge of prior level)+1) or rank(offset)−rank(last edge of prior level)−1. In the example, the rank(last edge of the prior level) is 3, which is a count of the set bits in positions 0 through 3 of the LOES encoding "10111011" 370.

Level boundaries (i.e. their indexes) can be either pre-calculated and stored when appending the level sequences (takes little memory) or calculated inductively on demand based on the following properties. The first level is always comprised of a single record of 2 Bits. To compute the length of level l+1 given the length of all previous levels, the number of set bits k in level l (its length; start and end in the sequence are known at this point) is computed using rank. So layer l+1's length is then 2k bits.

Set Iteration

Set-iteration works by a parallel sweep over the LOES sub ranges representing the distinct levels of the tree. The first element is represented by the first set bit on each level. The iteration ends after the leaf-offset is increased past the last set bit in the LOES. Algorithm 4 gives the pseudocode for advancing the iteration state from one element to the next element in the set.

---
Algorithm 4: advance iterator
---
Data: LOES an encoded state-set
Data: offsets an array of LOES offsets
level ← m − 1;
continue ← true;
while continue & level ≥ 0 do $rec_{id} \leftarrow \left\lfloor \frac{\text{offsets[level]}}{2} \right\rfloor;$ repeat
| offsets[level] ← offsets[level] + 1;
until LOES[offsets[level]] = true;

$\text{continue} \leftarrow rec_{id} \neq \left\lfloor \frac{\text{offsets[level]}}{2} \right\rfloor;$ ⌊ level ← level − 1;
---

Figure 6:
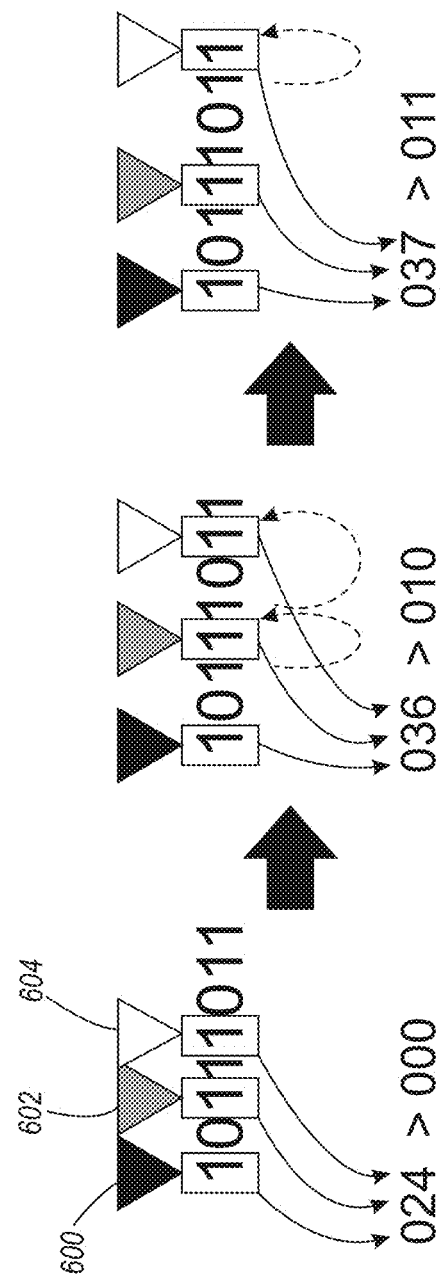
FIG. 6 is a diagram showing an example of how set iteration is performed.

Conceptually, starting from the leaf-level, the corresponding offset is increased until it addresses a set-bit position. If this advanced the offset past a record boundary (every 2 bits) the process is continued on the next higher level. As each record has at least one set bit, advancing to the next set bit crosses at most one record boundary. FIG. 6 shows the different iteration states for the present example, where the LOES number "10111011", is comprised of "10" at tree Level 0 (340), "11" at tree level 1 (350), and "1011" at tree level 2 (360). Even-offsets in the LOES correspond to false labels ("0") and odd-offsets to true labels ("1"). Hence elements can be easily reconstructed from the offsets-array. Note that the iteration always returns elements in lexicographical order. This property is used during set construction.

With continuing reference to FIG. 6, set iteration over the example set is shown. The first row in the diagram shows the LOES offsets that correspond to tree levels 0, 1, and 2 (340, 350, 360) indicated by black pointer 600, gray pointer 602, and white pointer 604. The second row shows how these offsets (mod 2) give the states (000, 010, 011) 220 represented by LOES "10111011" 370. The set of states are iterated by a parallel sweep over each of the levels in the LOES encoding where the first element is represented by the first set bit on each level (340, 350, 360). The sweep advances beginning at the lowest level from one set bit to the next. At each advance in bit pair advances, the next higher level pointer advances in a likewise fashion until all set bits are iterated. Note that the iteration always returns elements in lexicographical order.

Set Construction

LOES is a static structure. Addition of an element in general necessitates changes to the bit-string that are not locally confined, and the cost of a naive insertion is hence O(n). To elaborate on this topic, it is first considered how a sequence of lexicographically ordered states can be transformed into LOES. First empty bit-sequences are initialized for each layer of the tree. Algorithm 5 shows how these sequences are manipulated when adding a new state.

---

Algorithm 5: add state

---

Input: s a bitsequence of length m
Data: treelevels an array of bitsequences
Data: s' a bitsequence of length m or ⊥
if s' = ⊥ then
  depth ← −1;
if s' = s then
  return;
else
  depth ← i : ∀j < i, s[j] = s'[j] ∧ s[i] ≠ s'[i];
  treelevels[depth].lastBit ← true;
for i ← depth + 1 to m − 1 do
  if s[i] then
    treelevels[i] ← treelevels[i] ∘ ⟨01⟩;
  else
    treelevels[i] ← treelevels[i] ∘ ⟨10⟩;
s' ← s;

---

Particularly, if the set is empty, the corresponding records are appended on all levels. Else, the position or depth d of the first differing bit between s and s' is determined, the last bit of sequence d is set to true and then records according to s are appended to all lower levels. Duplicates (i.e. s=s') are simply ignored. After the last state has been added, all sequences are concatenated in level-order to form the LOES.

Figure 7:
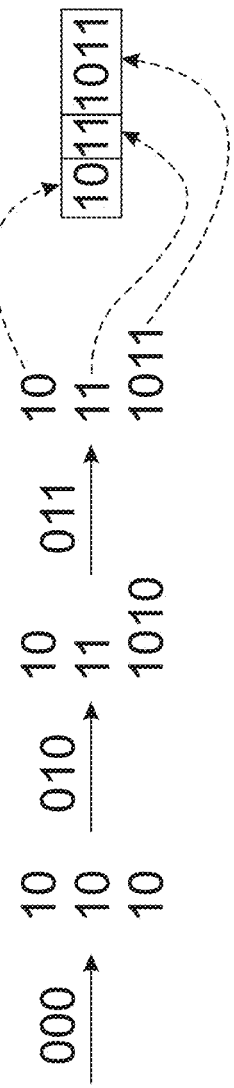
FIG. 7 is a diagram showing an example of how members to be added to a LOES encoding are first encoded as a LOES structure, which is then merged.

FIG. 7 depicts this process for the running example. Due to the LOES static nature, it is preferable to add states in batches. An iteration over a LOES-set returns elements in lexicographical order. In this way, it is possible to iterate over the initial set and the lexicographically ordered batch of states in parallel and feed them to a new LOES in the required order. If the batch is roughly the size of the set, the amortized cost of an insertion is then O(log n). The log stems from the need to have the batch in lexicographical order, in this context, it is noted that for optimal time performance, search or planning system based on LOES should be engineered around this property.

With continuing reference to FIG. 7, shown is an encoding for members to be added to a LOES encoding. Each member is encoded using bit pairs where each bit of the state to be encoded represents one bit of a bit pair in each level (tree level 0, tree level 1, tree level 2). For the state 000, each bit is a 0 and is therefore represented as 10 where the first bit is set to 1 to indicate the existence of a 0 or false leaf and the second bit is represented as 0 because there is no 1 or true leaf present. When adding a second member, bit pairs are already present, and thus only the appropriate bits in each level need be set. In the example of set 010, a bit is set in the second level to indicate a 1 or true leaf is present, and a bit pair is added in the third level as a leaf of the true leaf or set bit in the second level. When adding the third member, set 011, the bit pairs are present and set in the first and second levels. The appropriate bit of the bit pair in the last level need only be set. After each of the members is added, the sequences are concatenated in level order to form a LOES encoding. This LOES encoding of members to be added may then be merged with an original LOES encoding. It is preferable to add new states in batches.

The merging of LOES encodings is performed through set iteration in parallel. Set iterations yield states in lexicographical order. Thus, states are compared and their corresponding sequences added or modified, and then merged into a new LOES structure of the combined set of states. Duplicate states are simply ignored.

To minimize memory requirements of the merging of LOES encodings, bit-sequences can be held in equal size memory spaces, which support destructive reads. This permits freeing of unneeded memory spaces while traversing the structure and significantly reduces peak memory requirements for the merge operation.

Figure 8:
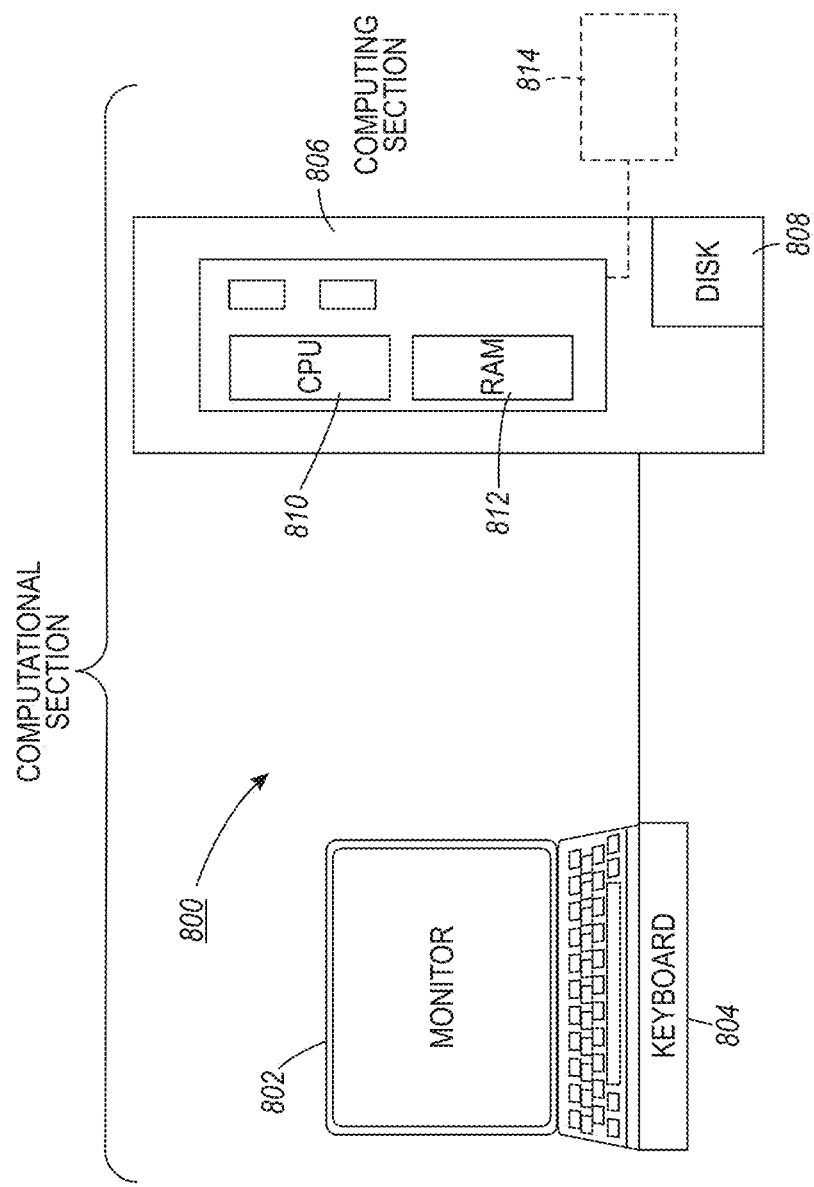
FIG. 8 depicts a system in which concepts of the present application may be employed.

It is to be appreciated the concepts described herein may be implemented on a variety of computational systems. An example of one such computational system (or electronic computing device) 800 is shown in FIG. 8, which includes, among other components, a monitor 802, keyboard 804, computing section 806 and external memory such as disk 808. Computing section 806 includes components such as a CPU, electronic processor, Graphical Processing Unit (GPU) or other computational component 810, and internal memory 812, such as a RAM. It is of course to be understood computing section 806 may include other components and may be designed in other configurations than shown here. External memory 808 is considered external, as it is external to computing section 806, which results in much slower I/O operations, as compared to internal memory storage 812. Also, disk 808 may or may not be physically enclosed with computing section 806, as illustrated by optional disk 814. For example, the optional disk 814 might be a network drive.

Empirical Evaluation

The foregoing concepts (e.g., a succinct adaptive state-set representation for planning) have been evaluated empirically. It is to be appreciated the following discussion and data (e.g., Tables 1 and 2) are presented with respect to a specific embodiment in a limited context. On the other hand, the presently described concepts are to be understood to be applicable in other embodiments and contexts. Thus, in this example, concentration was on peak-memory requirements during blind searches in a range of International Planning Competitions (IPC) domains. To this end, a breadth-first search environment was implemented for comparative evaluation of LOES and BODs. LOES was also compared with a state-of-the-art planner, Fast Downward (FD) in its blind-heuristic mode, SAS+ representations generated by FD's pre-processor were used as input for all tests, The BOD version of the planner is based on the BuDDy package (Binary Decision Diagram Package), which was treated as a black-box set representation. After each layer, a variable-reordering was initiated using the package's recommended heuristic. As the order of expansions within a layer generally differs due to the inherent iteration order of the BOD and LOES versions, Open and Closed were looked at after expanding the last non-goal layer for our tests. During the evaluation 128-byte chunks were used for LOES' bit-strings, as well as a one megabyte buffer for packed states, before they were transformed them into LOES, The test machine used had two Intel 2.26 GHz Xeon processors (each with 4 cores) and 8 GB of RAM. No multi-threading was used in the experiments.

Table 1 gives an overview of the results. For the size comparison, the table gives the idealized (no padding or other overhead) concatenation of packed states (Packed) as a reference for explicit state storage, In all but the smallest instances, LOES' actual peak-memory requirement is well below that of (ideally) Packed. Set-elements on-average required between 6-58% of the memory of the ideally packed representation on the larger instances of all test domains, As LOES eliminates a significant fraction of the redundancies BOD removes, its compression rate is analogous to the latter, albeit the variance is much smaller, LOES in particular avoids the blow-up BODs suffer in domains like freecell, microban and the n-puzzles, showing robustness across all test domains, LOES also does not rely on large sets for good compression, making it even more attractive than BODs if the majority of the search space can be pruned away by a good heuristic function. Another key advantage over BODs is that LOES allows one to easily associate arbitrary data to set elements without using pointers, which represent a significant storage overhead in symbolic as well as explicit-state search, It can be observed from Table 1 that the runtime comparison is not in favor of LOES, which took about 10 and 20 times longer than FD on the larger instances both can solve. While certain overhead stems from employing LOES, a significant part is due to the current implementation, which can be substantially improved. To expand a node, the present implementation performs a linear scan in the entire set of grounded operators to find the ones whose preconditions are satisfied; whereas FD uses a decision tree to quickly determine the set of applicable operators, Of course, the speed of the present planner can be improved if the same decision tree were used. Another source of overhead is that the current implementation is not particularly optimized for bulk insertions, since a small buffer was used to accommodate newly generated successors and whenever the buffer is full, it is combined with the next-layer LOES, which includes iterating over all previously generated states in the next layer.

TABLE 1

| Instance | $|O \cup C|$ | $s_{pck}$ | $s_{ioes}$ | $s_{bdd}$ | $t_{fd}$ | $t_{ioes}$ |
|---|---|---|---|---|---|---|
| Airport-P7 | 765 | 0.01 | 0.01 | 0.61 | 0 | 0.8 |
| Airport-P8 | 27,458 | 0.57 | 0.26 | 9.82 | 1 | 43.92 |
| Airport-P9 | 177,075 | 4.60 | 1.54 | 100.32 | 5 | 395.58 |
| Blocks-7-0 | 38,688 | 0.13 | 0.09 | 0.61 | 0 | 2.89 |
| Blocks-7-1 | 64,676 | 0.22 | 0.14 | 1.23 | 0 | 7.45 |
| Blocks-7-2 | 59,167 | 0.20 | 0.13 | 1.23 | 0 | 5.56 |
| Blocks-8-0 | 531,357 | 2.60 | 1.37 | 9.82 | 5 | 64.99 |
| Blocks-8-1 | 638,231 | 3.12 | 1.51 | 4.91 | 6 | 87.77 |
| Blocks-8-2 | 439,349 | 2.15 | 1.13 | 4.91 | 4 | 49.32 |
| Blocks-9-0 | 8,000,866 | 43.87 | 19.13 | 39.29 | 90 | 1832.57 |
| Blocks-9-1 | 6,085,190 | 33.37 | 16.54 | 39.29 | 73 | 1265.1 |
| Blocks-9-2 | 6,085,190 | 33.37 | 15.10 | 39.29 | 75 | 1189.86 |
| Blocks-10-0 | 103,557,485 | 629.60 | 271.02 | 130.84 | MEM | 110602 |
| Blocks-10-1 | 101,807,541 | 618.96 | 275.43 | 283.43 | MEM | 112760 |
| Blocks-10-2 | 103,577,485 | 629.60 | 283.75 | 130.84 | MEM | 110821 |
| Depots-3 | 3,222,296 | 19.97 | 2.77 | 69.81 | 72 | 1174.48 |
| Depots-4 | 135,790,678 | 1068.38 | 147.98 | 924.29 | MEM | 373273 |
| Driverlog-6 | 911,306 | 3.58 | 0.81 | 0.61 | 21 | 144.74 |
| Driverlog-4 | 1,156,299 | 3.72 | 0.83 | 0.61 | 20 | 195.22 |
| Driverlog-5 | 6,460,043 | 23.10 | 4.45 | 1.23 | 162 | 1689.65 |
| Driverlog-7 | 7,389,676 | 34.36 | 5.66 | 1.23 | 233 | 2735.61 |
| Driverlog-8* | 82,221,721 | 411.67 | 64.08 | 4.91 | MEM | 228181 |
| Freecell-2 | 142,582 | 0.97 | 0.52 | 9.82 | 3 | 80.81 |
| Freecell-3 | 1,041,645 | 9.19 | 4.47 | 39.29 | 25 | 904.13 |
| Freecell-4 | 3,474,965 | 36.04 | 20.19 | 100.32 | 95 | 4321.72 |
| Freecell-5 | 21,839,155 | 278.57 | 128.10 | MEM | MEM | 53941.8 |
| Freecell-6* | 79,493,417 | 1137.16 | 519.96 | MEM | MEM | 481452 |
| Gripper-5 | 376,806 | 1.48 | 0.11 | 0.31 | 3 | 65.26 |
| Gripper-6 | 1,982,434 | 8.74 | 2.06 | 0.31 | 20 | 466.55 |
| Gripper-7 | 10,092,510 | 50.53 | 2.69 | 0.61 | 123 | 2894.97 |
| Gripper-8 | 50,069,466 | 280.53 | 13.22 | 0.61 | MEM | 22720.9 |
| Gripper-9 | 243,269,590 | 1479.00 | 133.92 | 1.23 | MEM | 410729 |
| Microban-4 | 51,325 | 0.39 | 0.20 | 2.46 | 0.43 | 9.57 |
| Microban-6 | 312,063 | 3.01 | 1.33 | 4.91 | 3.27 | 247.02 |
| Microban-16 | 436,656 | 4.89 | 2.05 | 2.46 | 5 | 329.95 |
| Microban-5 | 2,200,488 | 22.30 | 10.35 | 69.81 | 29.3 | 676.4 |
| Microban-7 | 25,088,052 | 287.11 | 122.66 | 741.19 | MEM | 24574.1 |
| Satellite-3 | 19,583 | 0.04 | 0.01 | 0.04 | 0 | 2.25 |
| Satellite-4 | 347,124 | 0.95 | 0.12 | 0.08 | 13 | 74.5 |
| Satellite-5 | 39,291,149 | 182.67 | 14.27 | 4.91 | MEM | 28580.9 |
| Satellite-6 | 25,678,638 | 97.96 | 8.27 | 0.61 | MEM | 13684.6 |
| Satellite-7* | 115,386,375 | 591.47 | 37.96 | 2.46 | MEM | 380135 |
| Travel-4 | 7,116 | 0.02 | 0.01 | 0.08 | 0.08 | 0.42 |
| Travel-5 | 83,505 | 0.22 | 0.07 | 0.31 | 1.46 | 7.6 |
| Travel-6 | 609,569 | 1.82 | 0.41 | 1.23 | 14.4 | 77.09 |
| Travel-7 | 528,793 | 1.58 | 0.46 | 0.61 | 8.45 | 71.61 |
| Travel-8 | 14,541,350 | 62.40 | 10.28 | 19.64 | MEM | 8178.87 |
| Travel-9* | 68,389,737 | 317.95 | 50.93 | 161.36 | MEM | 167795 |
| Mystery-2 | 965,838 | 13.47 | 3.09 | 19.64 | 88.6 | 469.84 |
| Mystery-4** | 38,254,137 | 228.01 | 23.52 | 19.64 | MEM | 11674.1 |
| Mystery-5** | 54,964,076 | 563.49 | 150.90 | 130.84 | MEM | 290441 |

TABLE 1-continued

| Instance | |O ∪ C| | $s_{pck}$ | $s_{loes}$ | $s_{bdd}$ | $t_{fd}$ | $t_{loes}$ |
|---|---|---|---|---|---|---|
| 8-Puz-39944 | 181,438 | 0.78 | 0.42 | 4.91 | 1.08 | 26.49 |
| 8-Puz-72348 | 181,438 | 0.78 | 0.43 | 4.91 | 1.04 | 26.37 |
| 15-Puz-79* | 23,102,481 | 176.26 | 102.32 | 558.08 | MEM | 17525.6 |
| 15-Puz-88* | 42,928,799 | 327.52 | 188.92 | 771.70 | MEM | 71999.7 |

Table 1 shows empirical results for a number of IPC domains from both, a comparison of peak-memory requirements between an idealized concatenated bit-string of packed states, LOES and BDD and a comparison of runtimes between fast-downward (FD) and LOES. |O∪C| is a number of states in Open and Closed before the goal layer $s_{pck}$, $s_{loes}$ and $s_{bdd}$ are the respective peak memory requirements (in MB) of Packed, LOES and BDD storage components. $t_{fd}$ and $t_{loes}$ are the respective runtimes in seconds (or MEM if the process ran out of it). Instances denoted by * were still running, in which case the numbers from the largest layer both BDD and LOES processed were included. Instances denoted by ** have no solution. The numbers hence represent the reachable search-space.

Of course, FD does not store states in an ideally packed representation and instead uses highly time-efficient C++ STL-components for set storage, This results in significant space overhead, Table 2 gives a comparison of the peak process memory allocations for LOES and FD on the largest instance of each domain that both can solve. To show the influence of pointers, also included are numbers for a 32 Bit binary of FD. As shown in the table, FD uses up to two orders of magnitude more RAM than LOES. Given FD's more advanced successor generator, it is somewhat surprising that LOES is only slower by a constant factor as the size of the instance increases in each domain.

TABLE 2

| Instance | LOES | $FD_{64 Bit}$ | $FD_{32 Bit}$ | $\frac{LOES}{FD_{64Bit}}$ |
|---|---|---|---|---|
| Blocks-9-0 | 46.8 | 1460.3 | 990.9 | 0.03 |
| Depots-3 | 17.8 | 737.2 | 553.9 | 0.02 |
| Driverlog-7 | 37.9 | 3686.1 | 2142.9 | 0.01 |
| Freecell-4 | 53.7 | 1092.9 | 866.6 | 0.05 |
| Gripper-7 | 13.7 | 1720.5 | 1159.4 | 0.01 |
| Microban-5 | 31.6 | 682.9 | 422.9 | 0.05 |
| Satellite-4 | 18.6 | 101.8 | 64.2 | 0.18 |
| Travel-6 | 22.1 | 225.1 | 124.0 | 0.10 |
| Airport-9 | 11.4 | 171.9 | 152.8 | 0.07 |

CONCLUSION

LOES shows good space efficiency for representing explicit state-sets of all sizes, It provides robust space savings even in traditionally hard combinatorial domains such as the n-puzzles. In particular, it defines a consecutive address-space over set elements, which allows space-efficient association of ancillary data to set-elements without addressing overhead. In theory, LOES should also offer good time efficiency, especially on larger problems, because its complexity of set-member testing depends only on the size of the state encoding and not on the size of the set. A particular application for LOES is with pattern databases (PDBs). This class of heuristics traditionally depends on space-efficient representations with good look-up performance. LOES' static nature and potential construction overhead is of little concern for PDBs. LOES or similar representations incorporating the concepts of the present application may also be employed in duplicate detection and general set representations for heuristic search.

It is noted that a sorted list of packed states can be transformed to LOES with little overhead and that LOES provides good compression even on small sets. Also a merge sort like construction where very imbalanced LOES merges are delayed until a similar-sized counterpart exists can help to achieve an amortized O(log n) construction, In both cases unused RAM in a computing system can be used straightforwardly to speed up set construction, while the minimal peak-memory construction approach of the disclosed concepts serve as a fallback as memory becomes scarce.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for encoding state sets comprising:
    encoding a binary prefix tree representation of a set of state spaces as a level ordered edge sequence (LOES) of bit pairs which represent edges of each inner tree node from left to right, and top to bottom order and each bit identifies a presence of a leaf of each inner tree node by a first identifier and an absence of a leaf of each inner tree node by a second identifier; and
    wherein the method is performed by use of an electronic computing device.

2. The method according to claim 1, further comprising:
    generating a set of sample state spaces;
    inspecting the order of sampled state spaces in a top down manner; and
    creating a binary prefix tree representation which maximizes the average length of the common prefixes through permutations of the encoding bit order.

3. The method according to claim 1, further comprising:
    determining a rank of an offset by the number of bits set up to and including the offset.

4. The method according to claim 1, further comprising:
    determining a path from the root node to the leaf of the LOES comprising:
        testing bits of the LOES encoding for presence of a leaf for each bit representing a node in the path; and
        returning either a path failed or the offset in the LOES of the last node in the path.

5. The method according to claim 4, wherein a valid path comprises a state represented in the LOES.

6. The method according to claim 4, further comprising:
    determining a bijective member index to ancillary data to at least one member using a normalized rank of the path offset.

7. The method according to claim 1, further comprising:
    iterating a set of states by a parallel sweep over each of the levels in the LOES encoding where the first element is represented by the first set bit on each level, and advances beginning at the lowest level from one set bit to another and with each advance in bit pair advances the next level in a likewise fashion until all set bits are iterated.

8. The method according to claim 7, further comprising:
adding at least one member to the LOES encoding which comprises:
constructing for all members to be added the bit pairs at each level, wherein if the set is empty append the pair or if not empty setting the appropriate bit;
concatenating the levels into a second LOES encoding;
iterating both LOES encodings in parallel which provides a state set in lexicographical order; and
merging the LOES encodings to form a LOES encoding which includes the added members.

9. The method according to claim 1 wherein the identifier indicating the presence of a leaf is 1, and the identifier indicating the absence of a leaf is a 0.

10. A system configured to encode state sets comprising:
an electronic computing device having a memory storage and an electronic processor, wherein the electronic processor is configured to:
encode a binary prefix tree representation of a set of state spaces as a level ordered edge sequence (LOES) of bit pairs which represent edges of each inner tree node from left to right, and top to bottom order and each bit identifies a presence of a leaf of each inner tree node by a first identifier and an absence of a leaf of each inner tree node by a second identifier.

11. The system according to claim 10, wherein the electronic processor is further configured to:
generate a set of sample state spaces;
inspect the order of sampled state spaces in a top down manner; and
create a binary prefix tree representation which maximizes the average length of the common prefixes through permutations of the encoding bit order.

12. The system according to claim 10, wherein the electronic processor is further configured to:
determine a rank of an offset by the number of bits set up to an including the offset.

13. The system according to claim 10, wherein the electronic processor is further configured to:
determine a path from the root node to the leaf of the LOES comprising:
testing bits of the LOES encoding for presence of a leaf for each bit representing a node in the path; and
returning either a path failed or the offset in the LOES of the last node in the path.

14. The system according to claim 13, wherein a valid path comprises a state represented in the LOES.

15. The system according to claim 13, wherein the electronic processor is further configured to:
determine a bijective member index to ancillary data to at least one member using a normalized rank of the path offset.

16. The system according to claim 10, wherein the electronic processor is further configured to:
iterate a set of states by a parallel sweep over each of the levels in the LOES encoding where the first element is represented by the first set bit on each level, and advances beginning at the lowest level from one set bit to another and with each advance in bit pair advances the next level in a likewise fashion until all set bits are iterated.

17. The system according to claim 16 wherein the electronic processor is further configured to:
add at least one member to the LOES encoding which is configured to:
construct for all members to be added the bit pairs at each level, wherein if the set is empty the pair is appended or if not empty the appropriate bit is set;
concatenate the levels into a second LOES encoding;
iterate both LOES encodings in parallel which provides a state set in lexicographical order; and
merge the LOES encodings to form a LOES encoding which includes the added members.

* * * * *